United States Patent

[11] 3,631,367

[72] Inventors John C. Dutton;
 Daniel B. Scott, both of Rome, Ga.
[21] Appl. No. 85,137
[22] Filed Oct. 29, 1970
[45] Patented Dec. 28, 1971
[73] Assignee General Electric Company

[54] CONICAL LAYER TYPE RADIAL DISK WINDING WITH INTERWOUND ELECTROSTATIC SHIELD
 8 Claims, 6 Drawing Figs.
[52] U.S. Cl. .................................................. 336/70,
 336/5, 336/84
[51] Int. Cl. .................................................. H01f 15/04
[50] Field of Search ........................................ 336/69, 70,
 84, 187, 5, 12

[56] References Cited
 FOREIGN PATENTS
 862,267 3/1961 Great Britain ................ 336/187

Primary Examiner—Thomas J. Kozma
Attorneys—J. Wesley Haubner, Frank L. Neuhauser, Oscar B. Waddell and Joseph B. Forman ABSTRACT: A radial disk-type inductive winding for high-voltage electric apparatus wherein coil turns are interlaced in such turn-to-turn sequence that directly serially connected turns form conical layers of turns in coaxial nested relation, and wherein an insulated shielding conductor is interwound to occupy the last full length conical layer of turn positions at one end of the winding and is electrically connected at one point to the winding terminal at that end.

INVENTORS:
JOHN C. DUTTON,
DANIEL B. SCOTT,
BY J. Wesley Haubner
ATTORNEY

INVENTORS:
JOHN C. DUTTON,
DANIEL B. SCOTT,
BY J. Wesley Haubner
ATTORNEY

CONICAL LAYER TYPE RADIAL DISK WINDING WITH INTERWOUND ELECTROSTATIC SHIELD

BACKGROUND AND OBJECTS OF THE INVENTION

Our invention relates to inductive windings for electrical apparatus such as transformers, reactors and the like, and more particularly to high-voltage radial disk windings of the coaxial conical layer type. The invention is directed to means for improving voltage distribution and reducing electrostatic stress at the end regions of such a winding upon the imposition of steep wave front impulse voltages, as due to lightning, switching surges and the like. The following prior art is representative of that now known to applicants: U.S. Pat. No. 3,387,243 to Carpenter et al., U.S. Pat. No. 2,905,911 to Kurita, British Pat. No. 862,267 to Parsons.

It is well known that highly inductive windings, as in iron core transformers and reactors, when exposed to steep wave front impulse or transient voltages exhibit initially an exponential distribution of voltage drop along the length of the winding, with a very high-voltage gradient at the first few turns. For example, in a continuous-type radial disk winding approximately 60 percent of the voltage may appear across the first 5 percent of the turns at the high-voltage end. This extremely nonuniform distribution of voltage is due primarily to the unavoidable distributed capacitance between each incremental part of the winding and adjacent grounded parts such as the core and casing structure. Such ground capacitance is referred to as "parallel" capacitance. Such a winding inherently possesses also a distributed capacitance between turns and groups of turns, the sum of such capacitance between turns and groups of turns, the sum of such capacitance being in series between the winding terminals. If this "series" capacitance alone were present, voltage distribution throughout the winding would be substantially uniform and linear, as it would be also if inductance alone were present, However, since distributed capacitance, both series and parallel, is an inherent winding characteristic, voltage distribution in the presence of impulse voltage is a design consideration of importance.

The two principal winding configurations used in power transformers of high voltage and current rating are the "layer" type, formed as a cylindrical helix or group of concentric helices, and the radial spiral or "disk" type. In a continuous disk-type winding, each of a plurality of annular coils is wound as a radial spiral, the coils (i.e., radial spirals) being disposed in axial juxtaposition on a linear core and connected electrically in series circuit relation.

It is known that the layer-type winding has a more linear transient voltage distribution than does a continuous disk-type winding, because the series capacitance of a layer winding is large relative to its parallel capacitance. However, for some high-voltage windings the disk type is used in order to avoid a high-voltage gradient (and consequent heavy insulation) between helical layers at normal operating voltage. Thus, medium power, high-voltage transformers often have low-voltage windings of the layer type and high-voltage windings of the disk type. In such a transformer the low-voltage winding is commonly located immediately adjacent the core and is surrounded by the higher voltage disk winding. Relative to the high-voltage winding, the entire low-voltage winding is at approximately ground potential, and the radial space between them, called the "main gap," is an essential design parameter. The radial dimension of the main gap is determined primarily by two considerations. One is the maximum permissible voltage stress across the gap at the low power circuit frequency; the other is the voltage stress arising from high-frequency transient voltages. In practice, the latter consideration often controls the size of the main gap in disk-type transformers. In disk windings with adjacent coils directly connected in series circuit relation (i.e., continuous disk windings) the nonlinearity of coil-to-coil impulse voltage stress usually requires that the first several coils at the high-voltage end be provided with extra insulation. For reasons of size and economy it is desirable to reduce the size of the main gap and to reduce the amount of insulation between winding coils and coil turns. All these results may be accomplished if the normally steep exponential impulse voltage distribution, which particularly characterizes the continuous disk winding, can be favorably modified and brought closer to ideal uniform linear distribution.

It is known that the transient voltage distribution between axially juxtaposed coils or groups of coils in a disk-type winding may be improved by various expedients which increase series capacitance relative to parallel capacitance. One such expedient is to modify the turn-to-turn sequence in each series circuit through the disk coils by "interlacing" so that certain coil turns or groups of turns lie in coils previously traversed by a higher voltage portion of the series circuit. In one such arrangement, as shown in British Pat. No. 862,267, the series turn sequence progresses axially forward and backward and radially inward and outward in stepped turn-to-turn relation through a groups of adjacent coils to form conical layers of conductor turns in coaxial nested relation. Such a conical layered disk winding offers the advantage over other forms of interlacing in that all coils may be "upwound" with a continuous unbroken conductor.

In a diagonal or conical layer-type winding formed of disk coils the conical layers of turns at opposite ends of the windings are shortened and the layer-to-layer capacitance between these short conical layers is less than between full length layers at the center of the winding. Such smaller series capacitance at the ends of a conical layer winding contributes to nonlinear voltage distribution under impulse conditions, particularly at the high voltage or line end of the winding where the voltage drop tends to concentrate. While this condition might be counteracted with static plates, rib shields or other shielding means now known to those skilled in the art, all these expedients require additional labor, added space or costly methods of coil winding or coil interconnection. It is desirable if possible to increase series capacitance at the ends, and particularly at the high-voltage end, of such a conical layer winding by means integral with the winding itself.

Accordingly, it is a principal object of our invention to provide a high-voltage inductive winding for electric apparatus having a radial disk-type configuration and a diagonal or conical layer-type series turn sequence which includes means for counteracting the inherently low layer-to-layer series capacitance at the axial end regions of the winding.

It is another object of our invention to improve the impulse voltage characteristic of a conical layer-type disk winding at its high-voltage end without the need for external auxiliary shielding devices.

It is a more particular object of our invention to provide an improved high-voltage winding for electric power transformers which comprises a plurality of axially juxtaposed disk-type coils serially connected in conical layer-type turn-to-turn sequence and provided with interwound electrostatic shielding means at one or both ends of the winding.

It will be understood by those skilled in the art that in referring to the high-voltage end or ends of a winding we mean to identify the so called "line" terminal portion as distinguished from grounded or neutral voltage portions. Thus a single-phase or wye-connected winding grounded at one end has only one high-voltage line terminal, while if grounded at an intermediate point it may have two line voltage ends connected to a common terminal. Similarly, delta connected windings have high-voltage terminals at both ends relative to a lower voltage center point. Our invention is equally applicable to all such high-voltage windings.

In carrying out our invention in one preferred embodiment we wind a continuous electric conductor about a magnetizable core to form a plurality of axially juxtaposed radial disk coils having substantially equal numbers of radially superposed conductor turns. The conductor traverses the coil turns in such series turn-to-turn sequence that it forms a plurality of coaxial conical layers of turns in nested relation. The turns of each conical layer are stepped alternately radially inward and radially outward from coil to coil through a succession of adjacent disk coils (hereinafter called a "set" of coils), and may comprise one or more conductor turns in each successive coil as the radial progression proceeds from coil to coil. In such a winding the resulting conical layers of turns act as a plurality of capacitors to increase the series capacitance of the winding relative to that of a simple continuous disk winding. This desirable effect is limited to some extent at both axial ends of the conically layered winding, or winding portion, by the fact that the conical turn layers at the ends are progressively shortened by the radial configuration of the disk coils.

In the winding described, the shortened conical layers of turns at opposite ends of a disk winding have smaller mutual capacitance between them than do the full length conical layers of turns in the intermediate region of the winding. This lesser series capacitance between layers at the ends of such a winding contributes to nonlinearity of impulse voltage distribution, particularly at the high-voltage or line end of a winding. It is desirable therefore that electrostatic shielding means be provided to improve the series capacitance at the ends of the winding beyond the last full length conical layer, especially at the high-voltage end. For this purpose our invention includes a second, and preferably more heavily insulated, conductor interwound with the end, or terminal, sets of disk coils, at least at the high-voltage end, in such a way that it constitutes the last full length conical layer of turns at that end. This second conductor is electrically connected at one point to a point in the series circuit through the winding which is at or near the adjacent end terminal, and thus constitutes an electrostatic shield. If desired, the shielding effect may be improved by continuing the shielding conductor into and through a spirally wound coil axially beyond the terminal and of the series circuit coils. By this means the series capacitance of a conical layered disk coil may be improved at the shortened end layers by the simple expedient of interwinding a second conductor integrally with the disk coils, thereby eliminating need for expensive and space consuming external shielding auxiliaries.

Our invention will be more fully understood and further objects and advantages thereof further appreciated by referring now to the following detailed specification taken in conjunction with the accompanying drawings in which.

Figure 2:
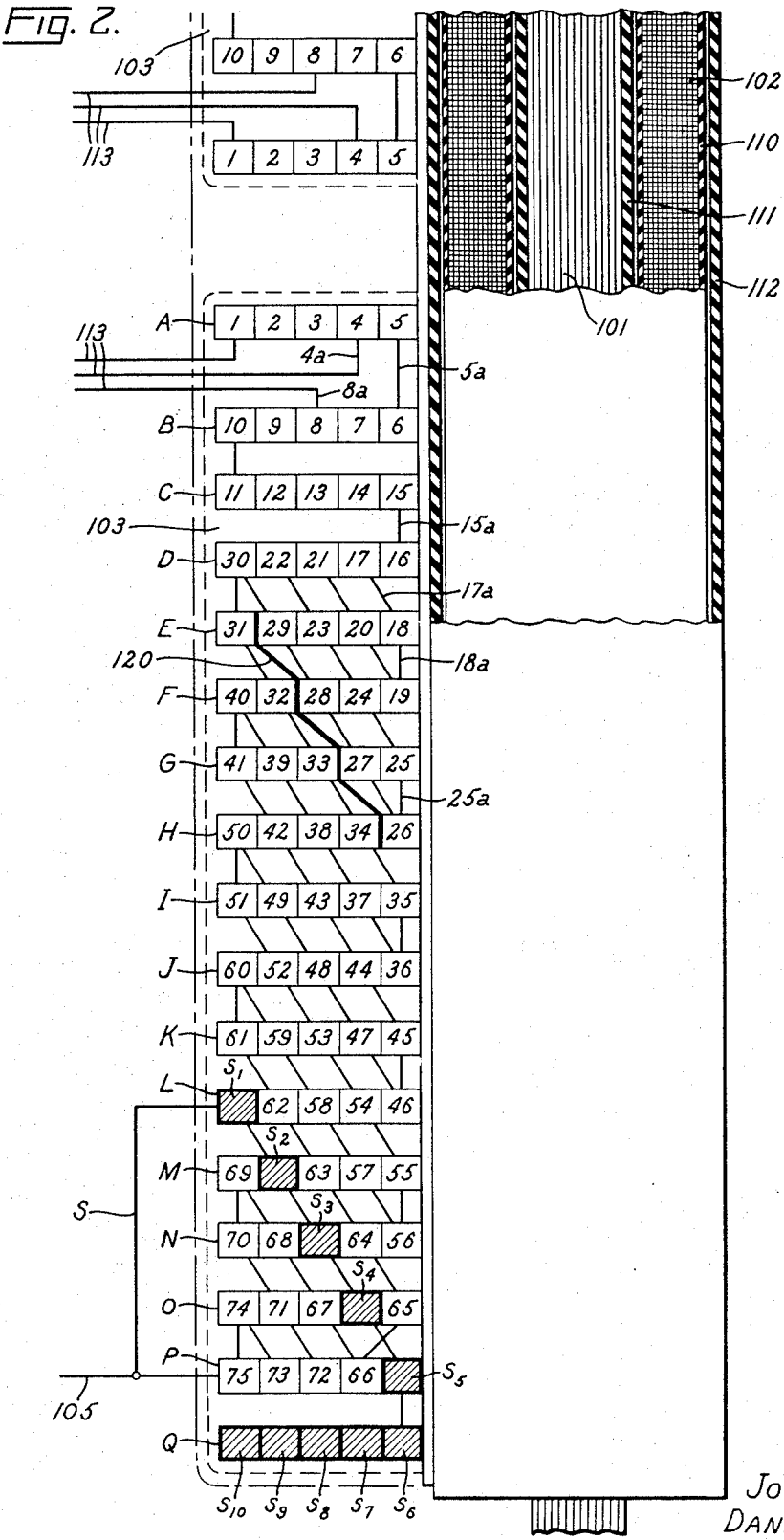
FIG. 2 is a fragmentary cross-sectional view of the winding structure on one winding leg of a transformer such as that shown at FIG. 1, illustrating a high-voltage disk-type winding embodying our invention.
Figure 4:
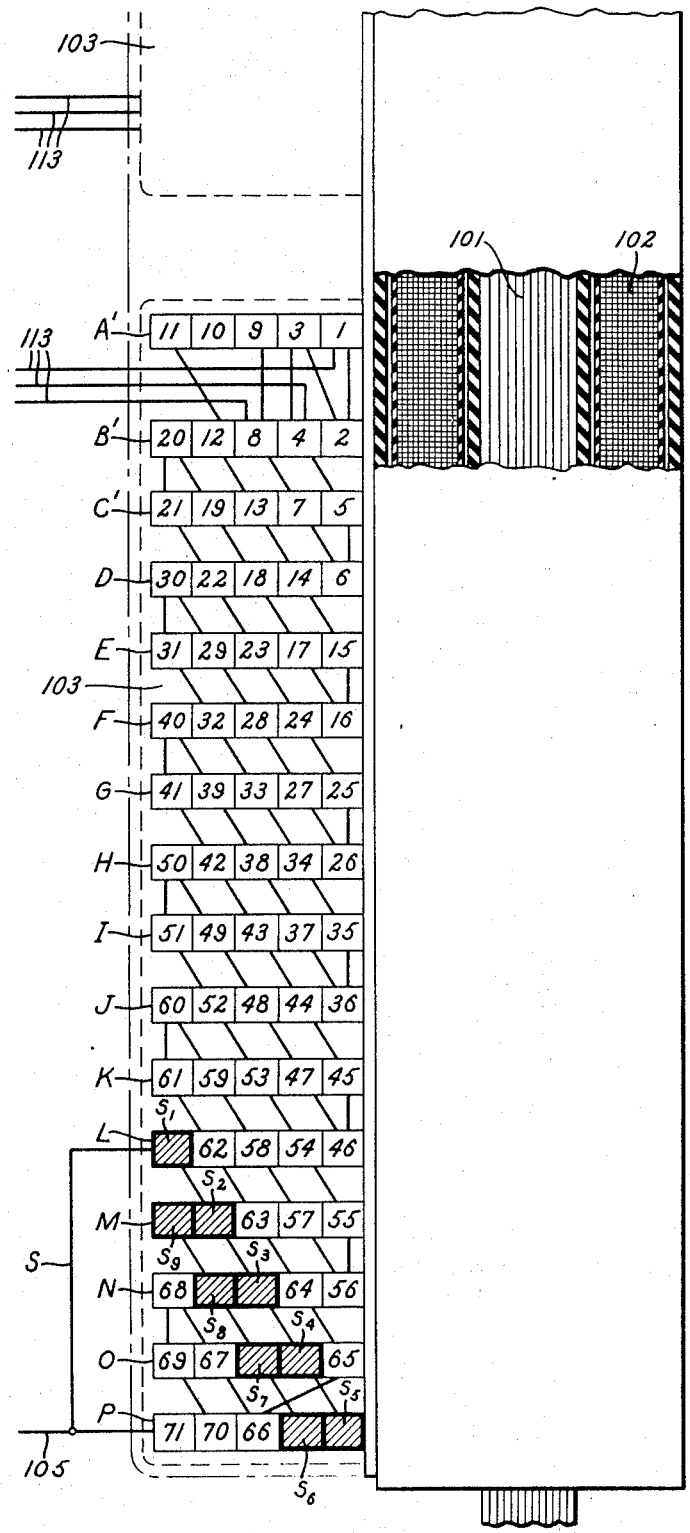
FIG. 4 is a fragmentary cross-sectional view similar to that of FIG. 2 but illustrating certain modifications of winding configuration which constitute other embodiments of our invention.
Figure 6:
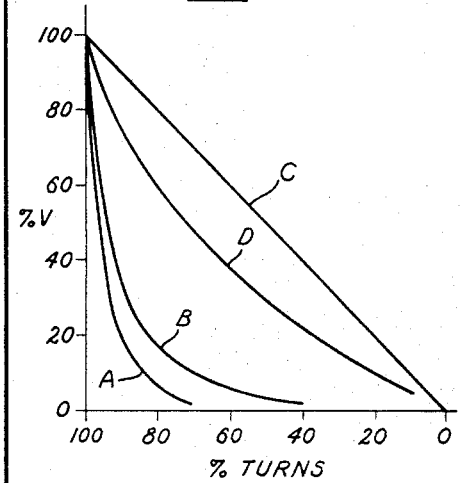
Figure 5:
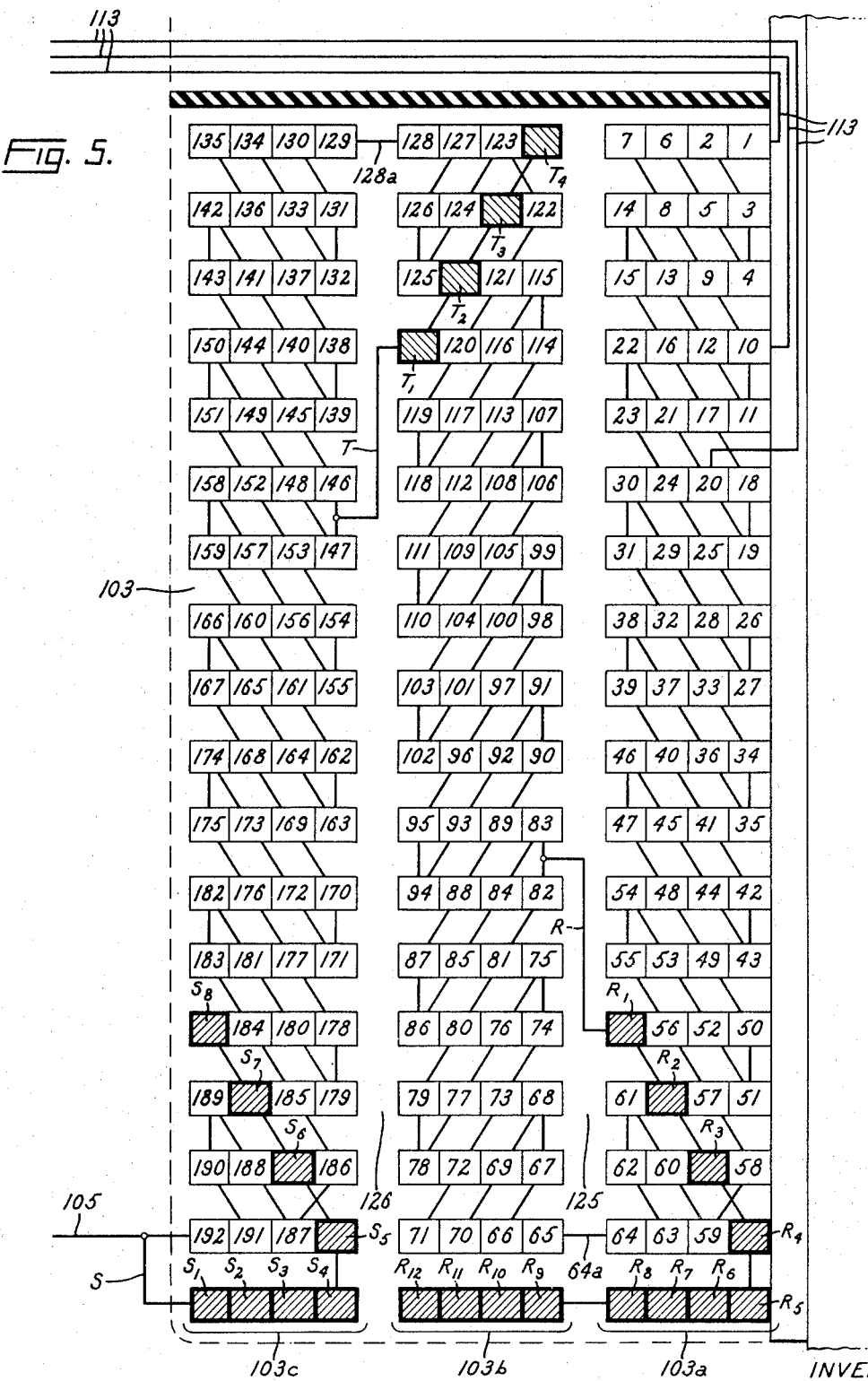

FIG. 5 is a fragmentary cross-sectional view of a transformer winding similar to that of FIGS. 2 and 4 but illustrating our invention applied to a winding formed of several concentric groups of disk coils, and p FIG. 6 is a diagrammatic illustration of the impulse voltage distribution characteristics of several different types of high voltage transformer windings, including a winding embodying our invention.

Figure 1:
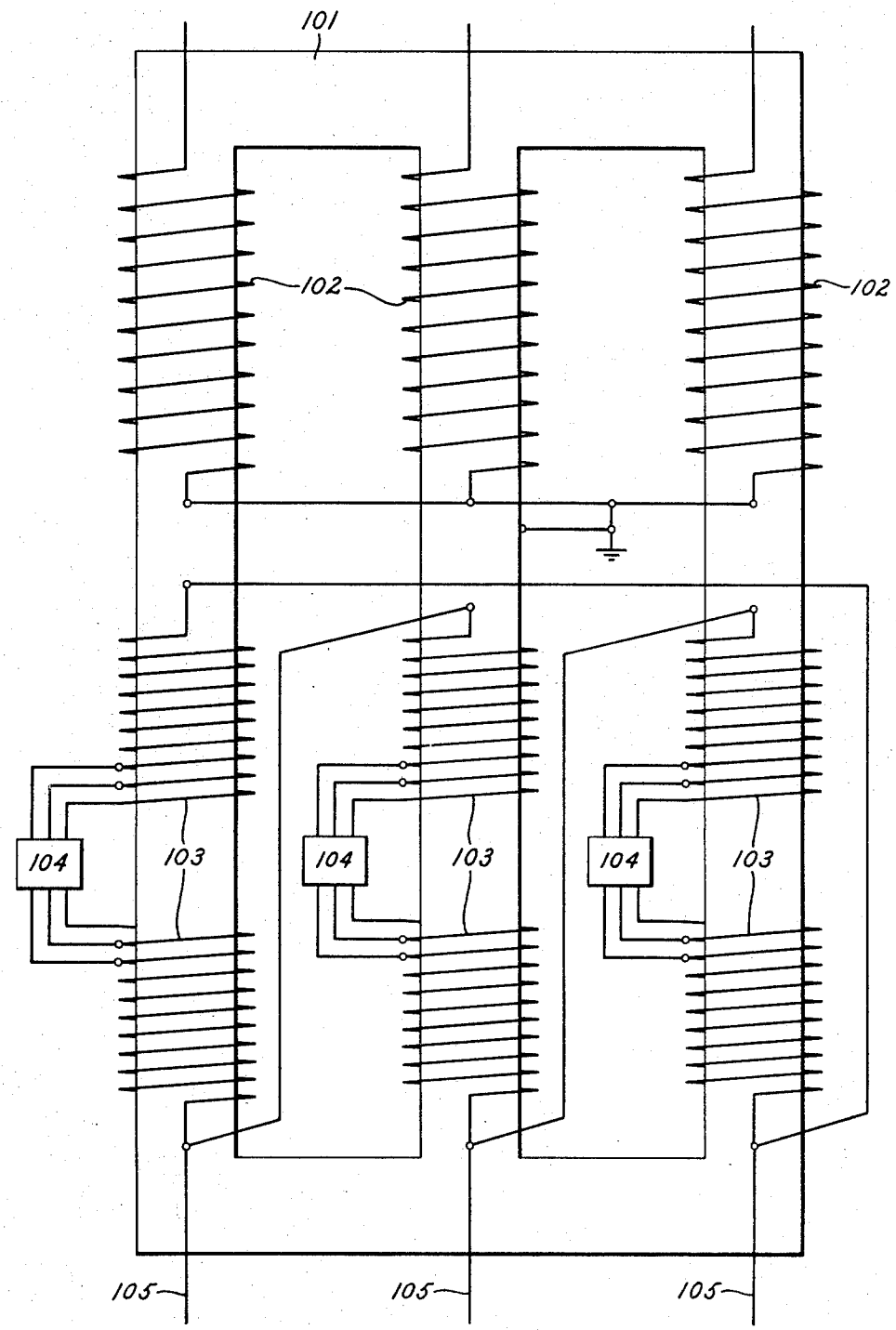
FIG. 1 is a schematic side elevational view of a typical electric transformer to which our invention is applicable.

Referring now to the drawing, we have shown schematically at FIG. 1 a three-phase electric transformer comprising a three-legged core 101 having a low-voltage phase winding 102 and a high-voltage phase winding 103 on each leg. Each high-voltage winding 103 is shown comprising two axially spaced-apart sections connected in series circuit relation through a tap changer 104 in a manner well known to those skilled in the art. The low-voltage windings 102 are shown connected in wye circuit relation with the neutral connected to the core 101 and to ground. The high-voltage windings 103 are shown connected in delta circuit relation and to the high-voltage line conductors 105 of a three-phase circuit.

At FIG. 2 we have illustrated suitable coil structure for a transformer of the type shown schematically at FIG. 1, showing only a single winding leg and illustrating the high-voltage winding 103 at only one end of the core axis. Because the two axially spaced sections of each winding 103 are similar in all respects except for reversed orientation from the axial midpoint of the core leg, only one section of the winding 103 has been shown in full.

It will be understood as the description proceeds that, while we have shown for the purpose of illustration a core-type transformer having a low-voltage winding and two high-voltage winding sections on each leg, our invention is equally applicable to shell-type transformers, to reactors and to other apparatus including high-voltage inductive windings, whether the windings be in one or more sections and whether they be of the single phase or multiphase type. Moreover it will be evident that our invention is applicable to disk-type high-voltage windings both with and without tap sections, both such embodiments being shown in the drawings and described herein. The characteristic features of our invention concern more particularly the structure, turn orientation and shielding of a high-voltage winding or winding portion per se. In the case illustrated the invention concerns the high-voltage windings 103 of the transformer.

Referring now to FIG. 2, the low-voltage winding 102 on each core leg is of tubular configuration, closely surrounding the core 101. The associated high-voltage winding 103 is of the radial disk-type and is positioned concentrically around the low-voltage winding. The low-voltage winding 102, which may be of the helical layer type, is encased in a suitable insulating sheath 110. The space between the winding 102 and the core 101 is filled, at least partially, by a tubular insulating sleeve 111. The radial space between the low-voltage winding 102 and the high-voltage winding 103 is referred to as the transformer main gap, and a tubular insulating sleeve 112 is provided in this space. The several windings and insulating sleeves are radially spaced apart, as shown, to provide axial passageways for the flow of suitable cooling fluid (not shown).

It will be observed from FIG. 2 that the winding 102 on each core leg is shown as being common to two axially juxtaposed sections of the associated high-voltage winding 103. It will be understood that the winding 103 is connected at its axially remote ends to separate line conductors 105 as illustrated schematically at FIG. 1, one such conductor being shown at the lower end of winding 103 in FIG. 2. At FIG. 2 we have also illustrated several tap leads 113 taken from each section of winding 103 adjacent to their axially central juxtaposed ends. As will appear more fully hereinafter, the disk coils in the low-voltage region of these tap leads are most conveniently wound as conventional continuous disk coils even though the remaining higher voltage coils have the conical layered turn sequence characteristic of our invention.

Each section of each high-voltage winding 103, as shown at FIG. 2, is formed of a group of 16 disk shaped coils A, B, C–N, O, P, each of which comprises five radially superposed turns of rectangular conductor. The coil turns identified by numerals 1 to 75 are formed of an integral series circuit conductor in a turn sequence to be described and constitute a current conducting winding section. The remaining five coil turns identified as $S_1$–$S_5$, one in each of a set of five end coils at the high-voltage end, are connected electrically at one end to the high-voltage terminal lead 105. So connected the coil turns $S_1$–$S_{5a}$ do not carry load current but serve as an electrostatic shield at line potential.

In FIG. 2 the first three coil disks of each winding section 103 are wound as continuous radial spirals, with the turns of each disk directly in series circuit relation in the usual manner known as "continuous disk" winding. The turns of the first disk A are wound downward in the sense that an entering conductor 113 beginning at the radially outermost turn 1 of disk A progresses radially inward through turns 2, 3, 4 and 5. The radially innermost turn 5 of disk A is connected through a crossover connection 5a to the innermost turn 6 of the next adjacent winding disk B. The winding disk B is an upwound radial spiral terminating in an outermost conductor turn 10. The winding disk C is similar to disk A in that it is a continuously downward radial spiral terminating at an innermost turn 15.

From the turn 15 in disc C a crossover connection 15a enters a portion of the winding 103 which begins with disk D and embodies the interlaced "conical layer" turn sequence to which our improved shielding means is applicable. It will be understood by those skilled in the art that the spirally wound continuous disks A, B, C at the midpoint of the winding 103 are not essential to our invention in its broad aspects. Such continuous disk coils at the midpoint of a winding provide a convenient location in the winding for the connection of tap leads, and have been included to illustrate that a winding embodying our invention may include such tapped portions without adversely affecting its impulse voltage distribution.

Referring now to the winding disks D, E,—O, P, at FIG. 2, it will be observed that the crossover connection 15a constitutes one end or terminal lead of a winding portion which is physically of radial disk configuration, but in which the turn sequence of the series conductor through the winding is such that it results in a series of conical winding layers in coaxial nested relation. More particularly, it will be noted that the series circuit through the winding disks D, E—O, P begins with a radially innermost turn 16 of the disk D and proceeds through only a single radially superposed turn 17 before transferring through a crossover connection 17a to the radially innermost turn 18 of the next disk E. The series circuit then traverses a crossover connector 18a to the innermost turn 19 of disk F. Thereafter the series circuit steps radially outward and axially backward through successive turns 20 and 21 in the preceding disk coils E and D, respectively, and traverses one radially superposed turn 22 of disk D. The circuit then progresses radially inwardly and axially forward through successive turns 23, 24 and 25 of the disks E, F and G. In like manner a crossover connection 25a from the radially innermost turn 25 of disk G to the radially innermost turn of disk H initiates a superposed conical layer of turns 26, 27, 28, 29 and 30 in radially outward and axially backward stepping progression through the disks s H, G, F, E and , respectively.

Figure 3:
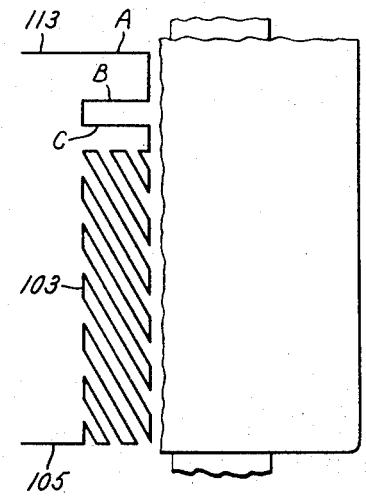
FIG. 3 is a diagrammatic representation of the series turn sequence through the disk winding illustrated at FIG. 2.

It will now be evident to those skilled in the art that the series turn progression through the winding disks (i.e., coils) D, E–O, P, continues in stepped turn progression from coil to coil, alternately radially inward and axially forward then radially outward and axially backward, to form a plurality of coaxially nested conical winding layers connected in series circuit relation. The physical orientation of such layers is indicated schematically at FIG. 3. At FIG. 3 the series circuit through one section of the high-voltage winding 103 begins at a tap lead 113, traverses the continuous spiral disks A, B and C in radially inward and radially outward progression, and then traverses the winding disks D, E–O, P in the diagonally oriented turn order described above, terminating at the high-voltage line lead 105. For convenience the disk coils included in any one conical layer of turns has been referred to herein as a "set" of coils.

It will also be readily understood by those skilled in the art that in building up a conical layer winding or winding portion in the form of disk coils the winding may be begun either by stepping from the first turn 15 (FIG. 2) to the second turn 16 in the axially juxtaposed coil D or, if desired, by stepping radially outward in the coil C and then to the innermost turn of the next coil D. The turns 1, 2, 3 at FIG. 5 illustrate this latter mode of beginning.

It will now be observed that in the conically layered winding portion comprising the disk coils D, E—O, P of FIG. 2 the conical turn layers at opposite end regions of that winding portion are axially shortened as a consequence of building the winding physically in the form of radial, or disk, coils. Thus in FIG. 2, the conical turn layers radially inside the last full length layer 26–30 at one end, and the conical turn layers radially outside the last full length layer 61–65 at the other end, are axially shorter than the intermediate full length conical turn layers. The layer-to-layer capacitance of these shortened layers at opposite ends of the winding is smaller than the layer-to-layer capacitance in the main body of the winding. As will be understood by those skilled in the art, this has an undesirable effect upon impulse voltage distribution in the sets of coils at the winding ends and the effect is particularly desirable at the high-voltage end of the winding where a major portion of the impulse voltage drop tends to occur.

To overcome the end effect of shortened turn layers in a conical layer disk-type winding we provide a second, or shielding conductor electrically connected to a point at or near one terminal end of the winding and interwound with the series connector to occupy coil turn positions in the end region of the winding which include at least the last full length conical layer of turns at that end of the winding. Such a shielding conductor is preferably insulated separately and more heavily than the series circuit conductor.

At FIG. 2 such a shielding conductor S is shown traversing turns $S_1$-$S_5$ in the disk coils L, M, N, O and P at the high-voltage end of the conically layered winding there illustrated. The conductor S is shown electrically connected at one end to the high-voltage line lead 105. It will of course be evident to those skilled in the art that substantially the same shielding effect will occur if the conductor S is connected to some other high-voltage winding turn in or electrically beyond the shielded region of the winding which lies radially outside the turn layer $S_1$-$S_{5a}$.

To further improve the impulse characteristic of the winding 103 in the high-voltage end region the shielding conductor S may be carried into an additional end coil Q and wound radially outward through turns $S_6$ -$_{S10}$ as a continuous disk coil. It will be appreciated by those skilled in the art that such an end coil Q, connected electrically to the high-voltage end terminal 105, functions additionally to the manner of a high-voltage line shield to increase series capacitance and reduce severe non linearity of impulse voltage distribution in the end region of the winding.

At FIG. 4 we have shown another embodiment of our invention in which disk coils A', B', C' at the low-voltage inner end of winding 103 are included in the diagonally or conically layered turn progression, rather than continuously wound alternately radially inward and radially outward as shown at FIG. 2. At FIG. 4 the shielding conductor S is carried through two juxtaposed conical turn layers $S_1$-$S_5$ and $S_6$ -$S_9$ at the end of the winding, beginning with the last full length conical layer and continuing into the first shortened layer. While the continuously wound end disk Q, illustrated at FIG. 2, is not shown at FIG. 4 it will, of course, be understood by those skilled in the art that if desired such a final shielding disk may also be provided.

At FIG. 5 we have shown still another embodiment of our invention in which the high-voltage transformer winding 103 (illustrated as before only at its lower axial half to one side of the tap leads 113) comprises three concentric groups of disk coils 103a, 103b and 103c. These concentric coil groups are mounted on the core with annular spaces 125, 126 between them to provide for circulation of cooling fluid. At FIG. 5, as in the other figures of the drawing, the turn sequence of the series circuit conductor as it progresses through the winding in conically layered orientation is indicated by the numbers shown on the winding turns from turn 1 to turn 192. The three concentric groups of disk coils 103a, 103b, and 103c, are all connected in the single series circuit from turn 1 to turn 192 and the circuit progresses through each group of coils in conically layered turn progression as described above. It will be noted that the conical turn layers in the concentric groups of disk coils are alternately oriented with their apices directed toward opposite ends of the central axis. While such alternate conical orientation is a matter of choice, the orientation illustrated at FIG. 5 tends to reduce the voltage difference between radially juxtaposed coil turns adjacent the annular spaces 125 and 126.

In addition to the concentric grouping of several conically layered disk winding sections as described above, FIG. 5 also illustrates an arrangement of interwound conical shielding layers especially applicable to such concentric groups of disk coils. At FIG. 5 a low-voltage line conductor 113 enters the winding at the low-voltage low-voltage turn 1, proceeds through the inner group of disk coils 103a in the numerical turn sequence shown and connects to the intermediate group of coils 103b through an internal connector 64a. The series circuit then proceeds in numerical turn sequence through the central group of coils to turn 128 and thereupon connects to the outer group of disk coils at a connector 128a. The series circuit then traverses the outer group of coils 103c and terminates at its high-voltage end terminal 105. Within this series circuit electrostatic shielding conductors are shown interwound in conical layered relation both adjacent the high-voltage end of the outer coil group and at several electrically intermediate points in the series circuit adjacent the crossover connections between coil groups. Specifically, the shielding conductor S first forms a continuously wound shielding disk (turns $S_1$ to $S_4$) and then proceeds through a conical turn layer in the outer coil group (turns $S_5$ to $S_8$). Adjacent the high-voltage end of the intermediate coil group 103b a similar shielding conductor T is interwound in conically layered relation through turns T1, T2, T3 and T4 and electrically connected at one point to a point of relatively higher voltage in the outer turn group, as between turns 146, 147 in the coil group 103c. Similarly at the high-voltage end of the inner coil group 103a and adjacent the internal connector 64a a shielding conductor R is interwound in conical turn relation (turns R1–R4) and connected externally to a pair of axially adjacent spirally wound end disks formed of turn R5–R8 and R9–R12. The end disks formed by conductor R are positioned at the lower end of the winding in the same radial plane with the shielding disk $S_1$–$S_4$.

By way of illustrating the beneficial effect of our invention upon impulse voltage distribution throughout the high-voltage winding 103, we have shown at FIG. 6 a series of voltage distribution curves in which the ordinant of each curve is the percent of initially applied instantaneous voltage, and the abscissa represents the winding location where such voltage appears in terms of percentage of total turns measured from the grounded low-voltage end. The curve 1 of FIG. 6 illustrates the initial instantaneous voltage distribution which would appear throughout the distributed parallel and series capacitance of a typical continuous disk winding if the series circuit were open. It will be understood of course that when a steep wave front impulse is initially applied to a winding, this theoretical condition is approximated because the very high inductive reactance substantially prevents any instantaneous flow of current through the coils of the winding. It will be noted from curve A, that substantially the entire voltage drop takes place in the first 25 percent of turns at the high-voltage end of the winding, and that about 60 percent of the voltage drop takes place in the first 5 percent of the winding of the high-voltage end. In the past this extremely unfavorable voltage distribution shown at curve A has bee n modified to some extent by adding series capacitance to a winding, for example, in the form of the so-called rib shields shown in U.S. Pat. No. 2,279,028 to Weed. At curve B of FIG. 6, I have shown a typical voltage distribution curve or a continuous disk winding provided with such rib shields. While the voltage gradient of curve B at the high-voltage end of the winding is still quite severe, it is appreciably improved. It will be understood, of course, that if the winding consisted solely of series capacitance or solely of inductance, the voltage distribution along the winding would be represented by the linear curve C of FIG. 6.

The effect of our invention is illustrated at curve D of FIG. 6. It will be noted that the initial or transient voltage distribution (curve D) for our improved winding is remarkably more linear than for the disk windings represented by curves A and B. In actual test it has been found that a continuous disk winding without shielding (curve A) may impose between the two highest voltage disk sections as much as 45 percent of an impulse voltage peak. With our improved combination of conical layered turn sequence and interwound shielding this maximum gradient has been found reduced to about 8 percent to 12 percent.

It will now be observed that a conically layered disk winding or winding portion embodying our invention requires a relatively large number of crossover connections, such as 15a, 17a, 18a, 25a and the like as illustrated at FIG. 2, between adjacent disk coils of the winding. These crossover connections may be simply made with a continuous length of conductor, because each crossover has only a short space to bridge between radially adjacent turns of axially adjacent winding disks, The crossover connections may be made in a single radial plane through the winding axis, or if desired, each such connection, or group of connections in one conical layer, may be angularly spaced from the preceding connection or group of connections in a spiral progression to constitute a web of connections around the winding. Whether made in a single plane or as a cylindrical web, the multiplicity of turn connections aids in physically supporting the winding and thus improves its strength under short circuit conditions.

Bending of the conductor as required to make crossover connections forms regions where dielectric strength is somewhat diminished. It is desirable to provide extra insulation in these regions. This may be easily and inexpensively done when the crossover connections of a single conical layer of turns are all in one radial plane. In this case strips of insulating material, preferably wider than the conductor, may be laid between the conical winding layers in the plane of the crossovers and on one or both sides of the crossover connections. A single strips of such insulation is shown by way of example at FIG. 2, and identified by the reference numeral 120.

It will now be understood by those skilled in the art that our improved conically layered disk winding may be included as a portion of a winding or winding section having other disk coils not wound in conically layer sequence, as the continuous disk coils A, B and C of FIG. 2, or coils reentrantly interlaced in pairs, as shown in U.S. Pat. No. 2,853,552 to Stearns. It will therefore be evident that when we refer hereinto a winding, or winding portion, or group of coils constituting a winding, described as interlaced in conically layered turned progression, such description does not exclude the presence as part of the total winding of additional disk coils otherwise connected in series circuit relation.

It will also be evident that, while we have described our conically layered disk winding as connected in series circuit length layer progression with a single turn of a set of adjacent not in each conical layer of turns, it is also possible to conically layer each disk coil turns by utilizing two, or more than two, radially superposed turns of each coil before proceeding to a radially offset turn, or group of turns, in made next coil.

Those skilled in the art will further appreciate that the interwound shielding conductor electrically connected as the last full length layer of turns at one end of such a winding (but not in the series circuit) may be continued through additional shortened conical layers and if desired may be continued through all of the short conical layers at the end of the winding. The connection of such a shield may appropriately be made to any point on the series circuit electrically beyond the potential of the shielded turns.

Thus, while we have described several preferred embodiments of our invention by way of illustration, many modifications will occur to those skilled in the art, and we therefore wish to have it understood that we intend in the appended claims to cover all such modifications as fall within the true spirit and scope of our invention.

What we claim as new and desire to secure by Letters Patent of the United States is:

1. In a high-voltage inductive winding for electrical apparatus, a group of disk-shaped coils axially juxtaposed along a linear axis, each said coil comprising a plurality of radially superposed winding turns and said coils being formed of at least one continuous series circuit conductor radially upwound alternately back and forth in axially and radially stepped turn progression through successive sets of juxtaposed disk coils, said conductor traversing said coils in series circuit relation through a succession of conical layers of coil turns disposed in coaxial nested relation, each said set of disk coils containing all turns in a single conical layer of turns, the conical turn layers and coil sets at opposite end regions of said group of coils being axially shortened by radial configuration of said coils, each said end region including the last full length conical layer of turns at that end, an insulated shielding conductor interwound with said series circuit conductor in at least one said end region to occupy coil turn positions in at least said last full length conical layer of turns, and means electrically connecting such shielding conductor at one point to a point on said series circuit displaced in potential in the direction of and beyond the adjacent end turn of said series circuit conductor.

2. A high-voltage inductive winding according to claim 1 including at said one end region a spirally wound end coil electrically connected to said shielding conductor.

3. A high-voltage inductive winding according to claim 1 having at least one high-voltage line terminal and wherein said shielding conductor is conically interwound adjacent said line terminal and electrically connected to said series circuit conductor in the region of said line terminal.

4. A high-voltage inductive winding as in claim !1 having at least one high-voltage terminal end and said shielding conductor is conically interwound adjacent said terminal end and electrically connected to a point on said series circuit having a series circuit potential higher than that of said terminal end.

5. A high-voltage inductive winding according to claim 1 wherein said shielding conductor occupies coil turn positions in at least two conical turn layers of said turn positions end region.

6. A high-voltage inductive winding according to claim 1 having a high-voltage line terminal at each axial end thereof and including an interwound shielding conductor in each end region electrically connected to said series circuit conductor in the region of the adjacent line terminal.

7. A high-voltage inductive winding according to claim 1 comprising at least two groups of coils disposed in radially spaced-apart concentric relation each said series circuit conductor traversing said groups in series circuit relation and in conical layer turn-to-turn relation in each group, and a separate shielding conductor interwound at the high-voltage series circuit end region of each said coil group, the highest voltage series circuit coil turn in said coil groups being electrically connected to the adjacent shielding conductor and the remaining shielding conductors being electrically connected to intermediate turn in an adjacent higher voltage coil group.

8. A high-voltage inductive winding according to claim 7 in which the conical turn layers of radially adjacent groups of coils are oppositely axially oriented.

* * * * *